US008005308B2

(12) United States Patent
Paniconi et al.

(10) Patent No.: US 8,005,308 B2
(45) Date of Patent: Aug. 23, 2011

(54) ADAPTIVE MOTION ESTIMATION FOR TEMPORAL PREDICTION FILTER OVER IRREGULAR MOTION VECTOR SAMPLES

(75) Inventors: Marco Paniconi, Campbell, CA (US); James J. Carrig, San Jose, CA (US); Zhourong Miao, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1601 days.

(21) Appl. No.: 11/228,681

(22) Filed: Sep. 16, 2005

(65) Prior Publication Data
US 2007/0064804 A1    Mar. 22, 2007

(51) Int. Cl.
G06K 9/46      (2006.01)
G06K 9/48      (2006.01)
H04N 7/12      (2006.01)
H04N 11/02     (2006.01)
H04N 11/04     (2006.01)

(52) U.S. Cl. ...... 382/236; 382/237; 382/241; 348/404.1; 348/407.1; 348/413.1; 375/240.16; 375/240.29

(58) Field of Classification Search ........................ None
See application file for complete search history.

(56) References Cited

U.S. PATENT DOCUMENTS

| | | | |
|---|---|---|---|
| 4,922,341 A | 5/1990 | Strobach | |
| 5,047,850 A | 9/1991 | Ishii et al. | |
| 5,654,771 A | 8/1997 | Tekalp | |
| 5,872,866 A | 2/1999 | Strongin et al. | |
| 5,974,188 A | 10/1999 | Benthal | |
| 6,178,205 B1 | 1/2001 | Cheung et al. | |
| 6,208,692 B1 | 3/2001 | Song et al. | |
| 6,212,235 B1 | 4/2001 | Nieweglowski et al. | |
| 6,466,624 B1 | 10/2002 | Fogg | |
| 6,480,615 B1 | 11/2002 | Sun et al. | |
| 6,590,934 B1 | 7/2003 | Kim | |
| 6,591,015 B1 | 7/2003 | Yasunari et al. | |
| 6,608,865 B1 | 8/2003 | Itoh | |
| 6,690,729 B2 | 2/2004 | Hayashi | |
| 6,754,269 B1 | 6/2004 | Yamaguchi et al. | |
| 6,765,965 B1 | 7/2004 | Hanami et al. | |
| 6,782,054 B2 | 8/2004 | Bellers | |

(Continued)

FOREIGN PATENT DOCUMENTS

WO    WO 00/16563 A1    3/2000

(Continued)

OTHER PUBLICATIONS

Wang et al. ("Spatio-temporal segmentation of video data", MIT Media Lab Vision and Modeling Group, Tech Report No. 262, 1994, pp. 1-12: hereafter "Wang").*

(Continued)

Primary Examiner — Tom Y Lu
Assistant Examiner — Thomas A Conway
(74) Attorney, Agent, or Firm — Blakely, Sokoloff, Taylor & Zafman LLP

(57) ABSTRACT

A method for determining values of motion vectors includes receiving an irregular pattern of motion vectors for a target image, estimating an initial value for each of the motion vectors, using the motion vectors to generate a tap structure for an adaptive temporal prediction filter, and using the tap structure to re-estimate the value of each motion vector.

24 Claims, 12 Drawing Sheets

U.S. PATENT DOCUMENTS

| | | |
|---|---|---|
| 6,864,994 B1 | 3/2005 | Harrington |
| 7,110,455 B2 * | 9/2006 | Wu et al. .................. 375/240.16 |
| 2004/0057517 A1 | 3/2004 | Wells |
| 2004/0062307 A1 | 4/2004 | Hallapuro et al. |
| 2004/0131267 A1 * | 7/2004 | Adiletta et al. ............... 382/236 |
| 2004/0233991 A1 * | 11/2004 | Sugimoto et al. ........ 375/240.16 |
| 2005/0100092 A1 | 5/2005 | Sekiguchi et al. |
| 2005/0135483 A1 | 6/2005 | Nair |

FOREIGN PATENT DOCUMENTS

| | | |
|---|---|---|
| WO | WO 01/78402 A1 | 10/2001 |
| WO | WO 02/37859 A2 | 5/2002 |
| WO | WO 2004/047454 A1 | 6/2004 |
| WO | WO 2005/006929 A1 | 7/2005 |

OTHER PUBLICATIONS

Leymarie et al, Tracking Deformable Objects in the Plane Using an Active Contour Model, IEEE Trans. on Pattern Analysis and Mach. Intel., vol. 15 No. 6, Jun. 1993, pp. 617-634.

Reshef et al, Low Bit-Rate Video Coding Using Iterave Affine Motion Estimation and Quadtree Segmentation, Proc. Int'l Conf. on Dig. Signal Processing, Jun. 1995 pp. 427-431.

Chang et al, Simultaneous Motion Estimation and Segmentation, IEEE Transactions on Image Processing, vol. 6 No. 9, Sep 1997, pp. 1326-1333.

Zhang et al, Image Sequence Segmentation Using 3-D Structure Tensor and Curve Evolution, IEEE Trans. on Circuits and Sys. For Video Tech., vol. 11 No. 5, May 2001, pp. 629-640.

Orchard et al, Overlapped Block Motion Compensation: An Estimation-Theoretic Approach, IEEE Transactions on Image Processing, vol. 3 No. 5, Sep 1994, pp. 693-699.

Du et al, Two Dimensional Hierarchical Mesh Based Video Compression Techniques, 6th Int'l Symposium on DSP for Communication Systems, 2002, Sydney Australia, pp. 247-252.

* cited by examiner

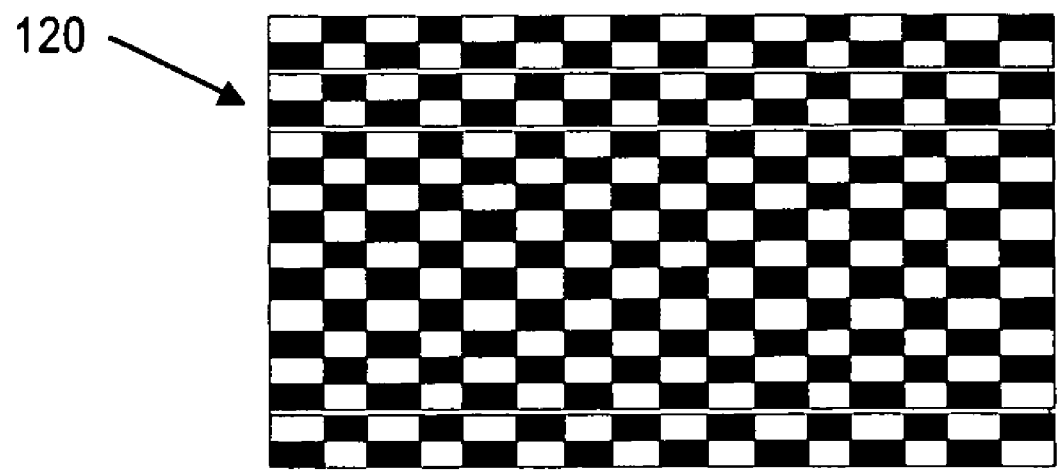
FIG. 1
(PRIOR ART)

ADAPTIVE MOTION ESTIMATION FOR TEMPORAL PREDICTION FILTER OVER IRREGULAR MOTION VECTOR SAMPLES

FIELD OF INVENTION

The invention is related to the field of video compression.

BACKGROUND

A temporal prediction filter is used in a video compression process to predict a target image from a set of previously decoded reference images. The temporal prediction process is effective at removing a significant amount of temporal redundancy, which generally results in a higher coding efficiency. The prediction process uses a set of motion vectors and a filter that operates on the motion vectors to predict the target image.

For example, the prediction method divides a reference image 110 into multiple fixed-size blocks 120, as shown in FIG. 1. Each block has an associated motion vector to describe the motion of the block relative to the target image. The motion vectors are shown by the white dots in image 110. A temporal prediction filter uses the associated motion vector to perform a simple motion compensation technique on each block in the reference image to predict the location of the block in the target image. Thus, each block in the target image is estimated from a block in the reference image using the single motion vector. However, this approach treats each motion vector independently and is not adaptive to image features.

Conventional temporal filters, which use a single motion vector to predict the location of an associated block, or rely on a filter defined for a regular motion vector pattern, need a regular distribution of motion vectors to perform temporal prediction. Therefore, they are unable to adapt the prediction process to an irregular pattern of motion vectors. There is a need for a filter that can locally adapt its tap and filter coefficients to the variations of an irregular pattern of motion vectors, and also has the flexibility to adapt to object boundaries and spatial textures. There is also a need for a efficient and effective motion estimation procedure that can use the temporal filter to estimate each motion vector value by taking into account the effects of neighboring motion vectors.

SUMMARY

A method includes receiving an irregular pattern of motion vectors for a target image, estimating an initial value for each of the motion vectors, using the motion vectors to generate a tap structure for an adaptive temporal prediction filter, and using the tap structure to re-estimate the value of each motion vector.

BRIEF DESCRIPTION OF THE DRAWINGS

The present invention is illustrated by way of example and may be better understood by referring to the following description in conjunction with the accompanying drawings, in which:

FIG. 1 shows an example of a conventional block based temporal filter.

DETAILED DESCRIPTION

In the following description, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. For example, skilled artisans will understand that the terms field or frame or image that are used to describe the various embodiments are generally interchangeable as used with reference to video data.

An adaptive temporal prediction filter is applied to an irregular pattern of motion vectors to produce a prediction of a target image. In one embodiment, each estimate of a motion vector is determined relative to a tap structure of the adaptive temporal filter for the irregular pattern. The estimate is made in two stages. In the first stage, an initial estimation of the motion vector, independent of the filter's tap structure, is determined. In the second stage, the tap structure is used during a re-estimation of the value of each motion vector. The tap structure that is applied to a particular motion vector is generated from a local pattern of neighboring motion vectors, to include their effects in the estimate of the particular motion vector. In some embodiments, an adaptive pixel influence area and an adaptive search window are used to reduce the complexity of performing the re-estimation process. Re-estimating the values of the motion vectors can be performed using a non-adaptive or an adaptive re-estimation procedure. A non-adaptive slow re-estimation involves a full search for a value of a particular motion vector within a search window having a fixed range. The value for the motion vector that results in the largest reduction in the prediction error is selected as the new value.

Figure 2:
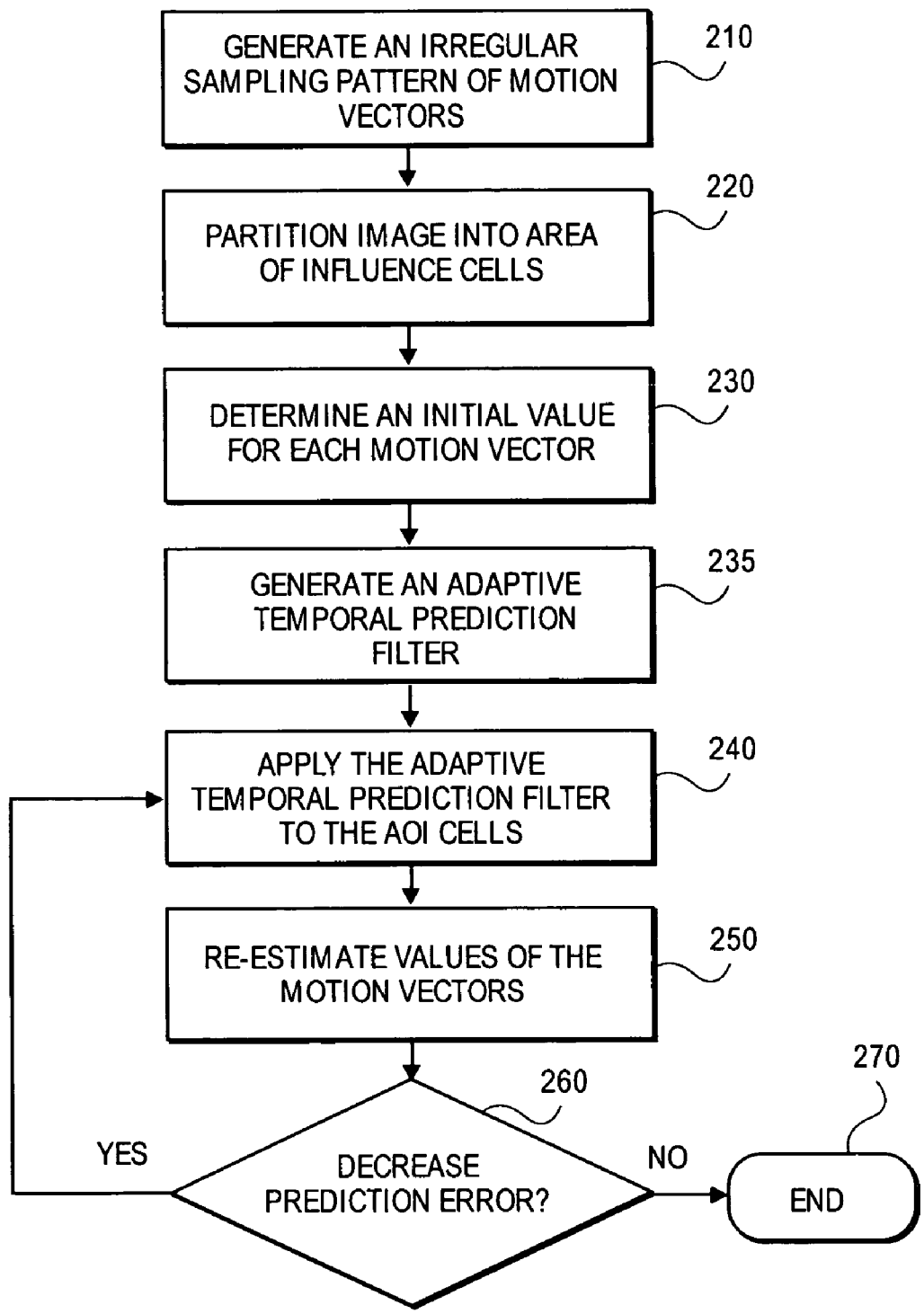
FIG. 2 shows an example of an adaptive temporal filtering procedure.

An example of an adaptive temporal filtering procedure is shown in FIG. 2. At 210, an irregular sampling pattern of motion vectors is generated for an image. Such irregular patterning may be done in various ways using methods that are known to those of skill in the art. An example of an irregular pattern of motion vectors is shown in block 310 of FIG. 3. The white dots in the image 310 represent the motion vectors. With this adaptive sampling pattern, the motion vectors are more concentrated in regions that are difficult to predict from the reference image (i.e., image regions with more complex motion, such as regions near moving boundaries). Fewer motion vectors are placed in simple motion regions, such as image background regions, for example.

Figure 4:
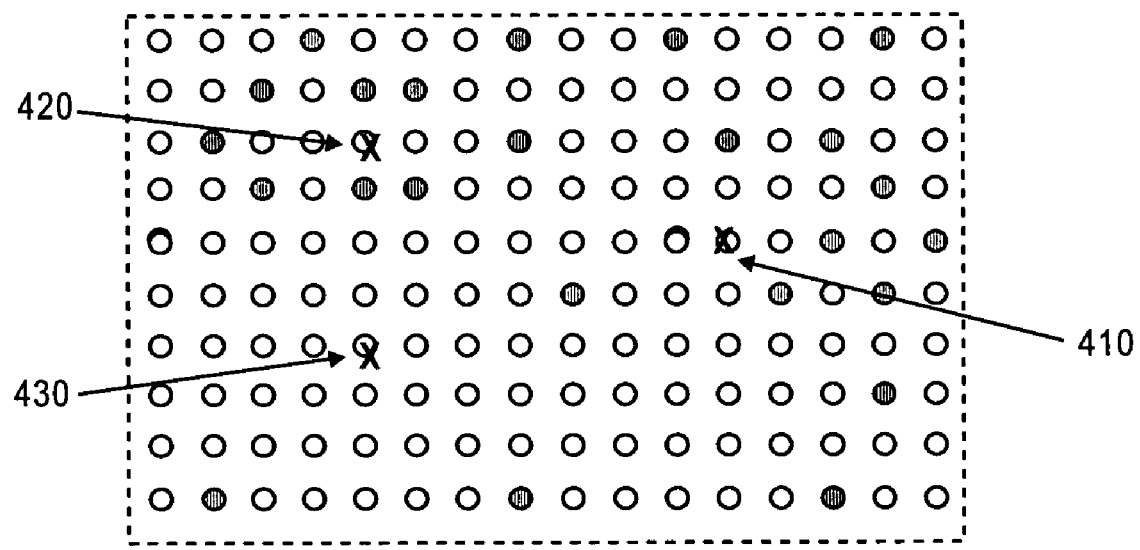

Another example of an irregular pattern of motion vectors is shown in FIG. 4. The shaded circles represent motion vectors, and each x represents a pixel to be predicted. Pixel 420 is in a local neighborhood of densely populated and irregularly distributed motion vectors, pixel 410 is in a local neighborhood of motion vectors that have a quasi-regular distribution, and pixel 430 is in a local neighborhood of sparsely populated motion vectors.

Figure 3:
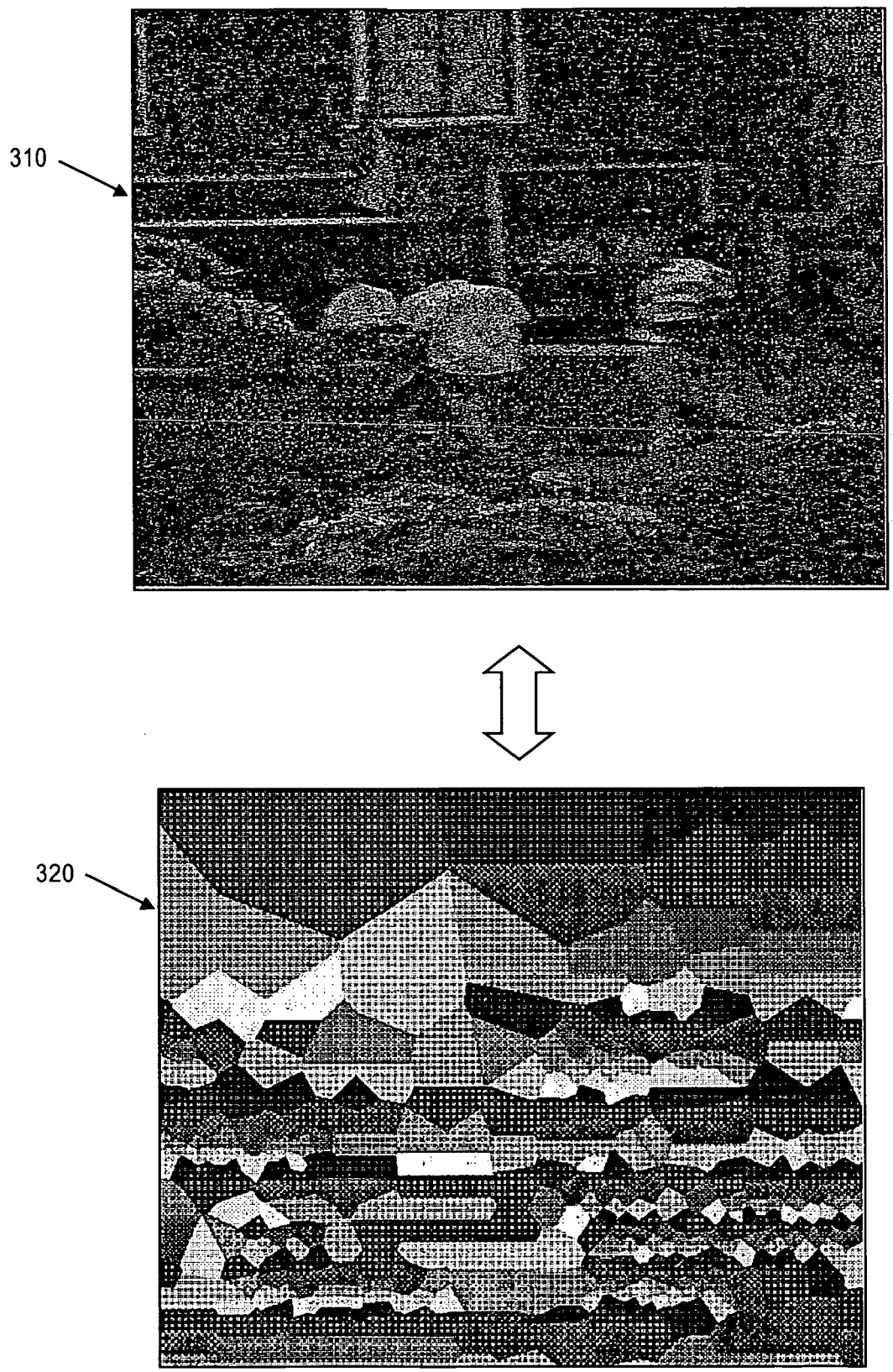
FIGS. 3 and 4 show examples of an irregular pattern of motion vectors and area of influence cells used in the adaptive temporal filtering procedure.

Returning to FIG. 2, at 220, the image is partitioned into multiple cells, called area of influence cells (AOI cells), where each AOI cell has one motion vector as its node. For example, the image 310 of FIG. 3 is partitioned into AOI cells as shown at block 320. Each AOI cell represents a region that is influenced more by the motion vector inside of the cell than by any other motion vector in the image. Because an AOI cell is generated for each motion vector, the size of the AOI cells may be related to features of objects in the image, such as boundary regions. For example, AOI cells near a boundary region between objects may be smaller than AOI cells in an image background region. Also, the shape of the AOI cell can be locally modified to adapt to the shape of an object's boundary. One embodiment of a method for generating AOI cells is a distance nearest motion vector partitioning method. Other partitioning methods may be used, such as block or triangular methods for example.

As shown in FIG. 2, at 230, an initial motion estimation is performed to determine an initial value for the motion vector in each AOI cell. The initial motion estimation maps the AOI cell associated with the motion vector to a corresponding cell in the reference image, and measures a displacement between the two cells. The displacement provides the initial value for each motion vector. Consequently, the initial value does not reflect any influence from surrounding motion vectors, because it is determined by this cell-to-cell mapping and displacement measurement. Therefore, the initial value for a particular motion vector is independent of other motion vectors.

In FIG. 2, at 235, an adaptive temporal prediction filter is generated for predicting the pixels in the target image using the irregular pattern of motion vectors and the area of influence cells. The filter has the following structure. Let $\{v_j\}$ denote the set of N motion vectors, and I(x) the reference image (a previously decoded image). Let S(x) denote some set of motion vectors surrounding the location of pixel x. The prediction of that target pixel x can be generally expressed as:

$$I^{pred}(x) = \sum_{i \in S(x)} f_i I^{ref}(x + v_i)$$

where $\{f_i\}$ is a set of filter coefficients, and $x+v_i$ is the motion compensated pixel when motion vector $v_i$ is applied to pixel x. The support or tap of the filter is defined by the set S(x). The tap support S(x) and the filter coefficients $\{f_i\}$ are, in general, functions of the pixel position x and its neighboring motion vectors. That is, the filter coefficients can change for each pixel, because the distribution of motion vectors changes throughout the image. Hence, the filter locally adapts to the changing motion vector pattern.

At 240, the adaptive temporal prediction filter is applied to the target image to perform temporal prediction for the target image. The filter is applied in the time domain to generate a prediction result for the target image given the set of motion vector values and sampling pattern. The filter uses a filter tap and filter coefficients that are defined by an area of overlapping regions to capture the relevance of motion vectors neighboring a pixel to be predicted. An example of this class of prediction filters is an area of influence filter disclosed in co-pending U.S. patent application Ser. No. 11/229,284 entitled ADAPTIVE AREA OF INFLUENCE FILTER by Marco Paniconi et al., concurrently filed with the present application and incorporated herein by reference; another example is a triangulation filter for motion compensated signals.

Figure 5A:
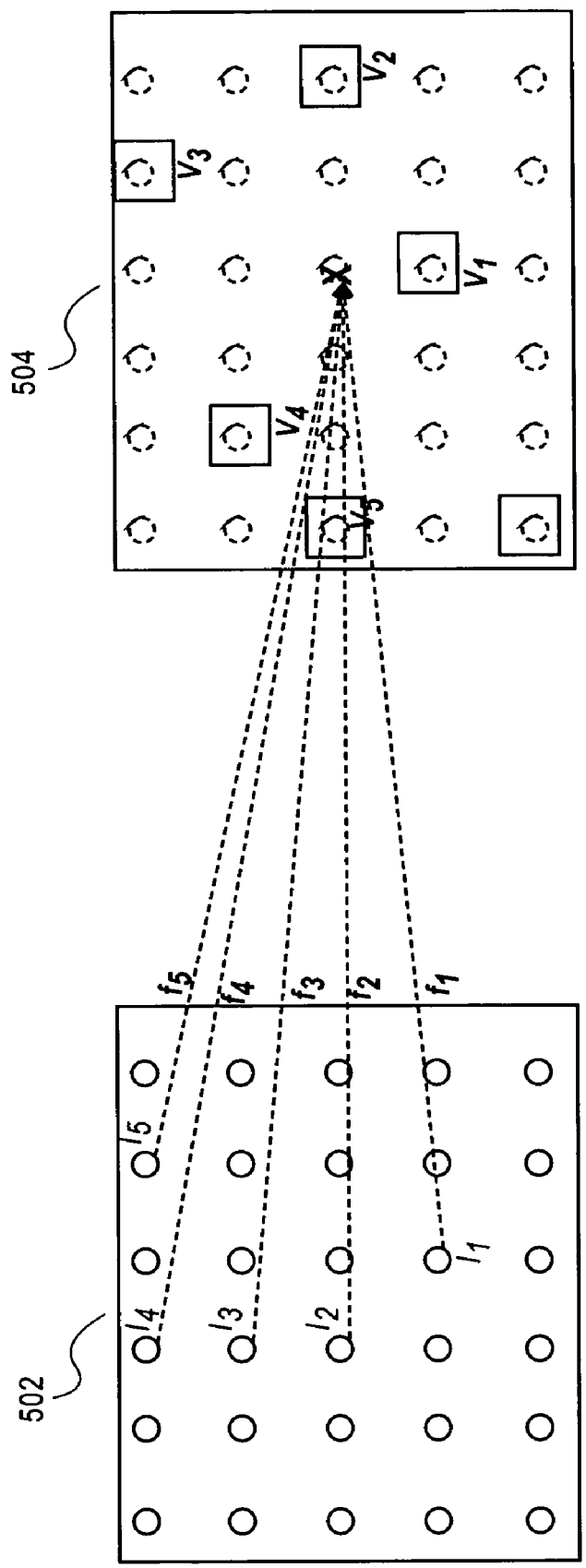
FIG. 5A shows an example of a prediction performed with the adaptive temporal filter.

An example of applying the filter to generate the temporal prediction is shown in FIG. 5A. Pixels in a reference image 502 are used to predict pixels in a target image 504. The reference pixels are represented by solid circles in reference image 502, and the target pixels to be predicted are represented by dashed circles in target image 504. The filter forms a prediction for pixel x in the target image 504 using a tap structure of local motion vectors $v_1$, through $v_5$. The motion vectors are local to pixel x because each of their respective AOI cells overlap with at least a portion of the AOI cell for pixel x. Each motion vector $\{v_i\}$ in the tap structure maps to image data $\{I_i\}$ in the reference image 502. The adaptive temporal prediction filter adjusts the reference data $\{I_i\}$ by a filter weight $\{f_i\}$ to predict pixel x.

In one embodiment, the prediction filter uses the tap structure and the filter weights to generate a prediction according to the following equation:

$$\text{Prediction}=I_1*f_1+I_2*f_2+I_3*f_3+I_4*f_4+I_5*f_5$$

where the filter tap, which is defined by the local motion vectors, and the filter coefficients $\{f_i\}$, are determined when the filter is generated.

Returning to FIG. 2, at 250, the prediction results produced by the filter are used to re-estimate the values of the motion vectors, so as to improve the accuracy of the adaptive filter. At 260 if the prediction error needs to be decreased the method returns to 240. Otherwise at 270 the process ends. The re-estimation of the value of a particular motion vector is performed to account for the effects of other motion vectors on the particular motion vector. A particular AOI cell represents a region of pixels that are influenced more by the motion vector inside of the cell than by any other motion vector in the image.

Figure 5B:
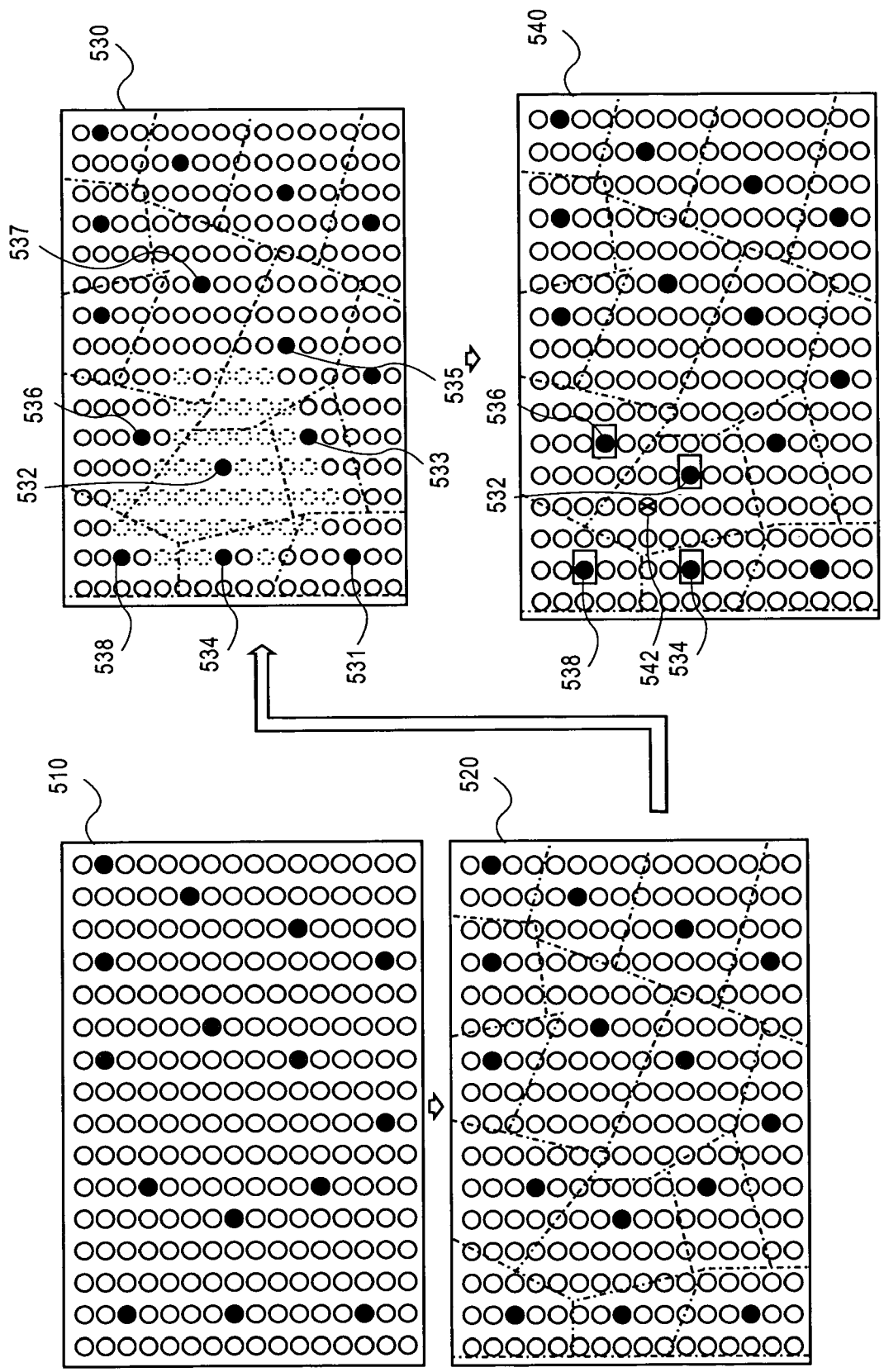
FIG. 5B shows an example of a total area of influence of a motion vector that is used in the adaptive temporal filtering procedure.

However, the influence of motion vectors of neighboring AOI cells extends into portions of the particular AOI cell. For example, as shown in FIG. 5B, a target image 510 has an irregular pattern of motion vectors, shown by the black circles, and pixels to be predicted, shown by the white circles. The target image 510 is partitioned into AOI cells, the boundaries of which are shown by the dashed lines in block 520. Block 530 shows the total influence of motion vector 532 on pixels in the target image. In general, the total area of influence of a particular motion vector extends beyond its AOI cell, to affect pixels in neighboring AOI cells. For example, the total area of influence of motion vector 532, as shown by the dotted circles, extends to some of the pixels in the AOI cells of neighboring motion vectors 531, 533, 534, 535, 536, 537 and 538.

The initial value of motion vector 532 was determined without considering the effects of the neighboring motion vectors. Therefore, to predict a value of a pixel in the associated AOI cell, the value of the motion vector 532 is re-estimated, to account for the effects of neighboring motion vectors within the associated AOI cell. The re-estimated value of the motion vector is used by the adaptive temporal prediction filter to predict the values of pixels in the target image. As a result of the re-estimation, the prediction error for all pixels in motion vector 532's area of influence cell is reduced.

For example, block 540 of FIG. 5B shows a target pixel 542 which is to be predicted. Target pixel 542, which is inside of the AOI cell for motion vector 532, is most influenced by motion vector 532. The target pixel is also partially influenced by neighboring motion vectors 534, 536 and 538. These four motion vectors form a tap structure for the adaptive temporal prediction filter, which is represented by the rectangles around the motion vectors. The overlapping effects of the neighboring motion vectors on the target pixel 542 are calculated to produce filter coefficients for the motion vectors in the tap structure. Each filter coefficient represents the relative influence of a particular motion vector on the target pixel. The temporal prediction filter uses the tap structure and filter coefficients to generate a prediction of the target pixel 542.

In order to re-estimate a particular motion vector, the overlapping influence of the motion vector with pixels in neighboring AOI cells, as shown for example in block 530 of FIG. 5B, is considered by determining the total area of influence of the motion vector. The area of influence for a motion vector is defined as the set $A_i^T$:

$$A_i^T = \{x_j | f_i^j > T\} \quad (2)$$

Thus, for a particular motion vector i, the area of influence is each pixel $\{x_j\}$ with a filter coefficient greater than a threshold T. The total pixel area of influence for motion vector i is defined as $A_i^{T=0}$. The dominant area of influence for the motion vector is defined using a larger threshold, such as $A_i^{T=0.5}$.

Another example of an overlapping area of influence uses the filter coefficients and a prediction error. In this example, the overlapping area of influence is:

$$A_i^T = \{x_j | f_i^j e(x_j) > T\} \quad (3)$$

where the magnitude of the prediction error signal for target pixel x is:

$$e(x) = |I^{target}(x) - I^{pred}(x)|$$

Thus, for a particular motion vector i, its area of influence is each pixel $\{x_j\}$ having a product of its filter coefficient and prediction error magnitude greater than a threshold T. The total pixel area of influence for motion vector i is defined as $A_i^{T=0}$. The dominant area of influence of the motion vector is defined using a larger threshold, such as $A_i^{T=0.5}$.

The average prediction error due to presence of motion vector i is determined by summing the errors of all pixels in the motion vector's area of influence, which is:

$$e_i^T = \sum_{x \in A_i^T} e^2(x) \quad (4)$$

where T controls the size of the motion vector's influence area as discussed above.

Figure 6:
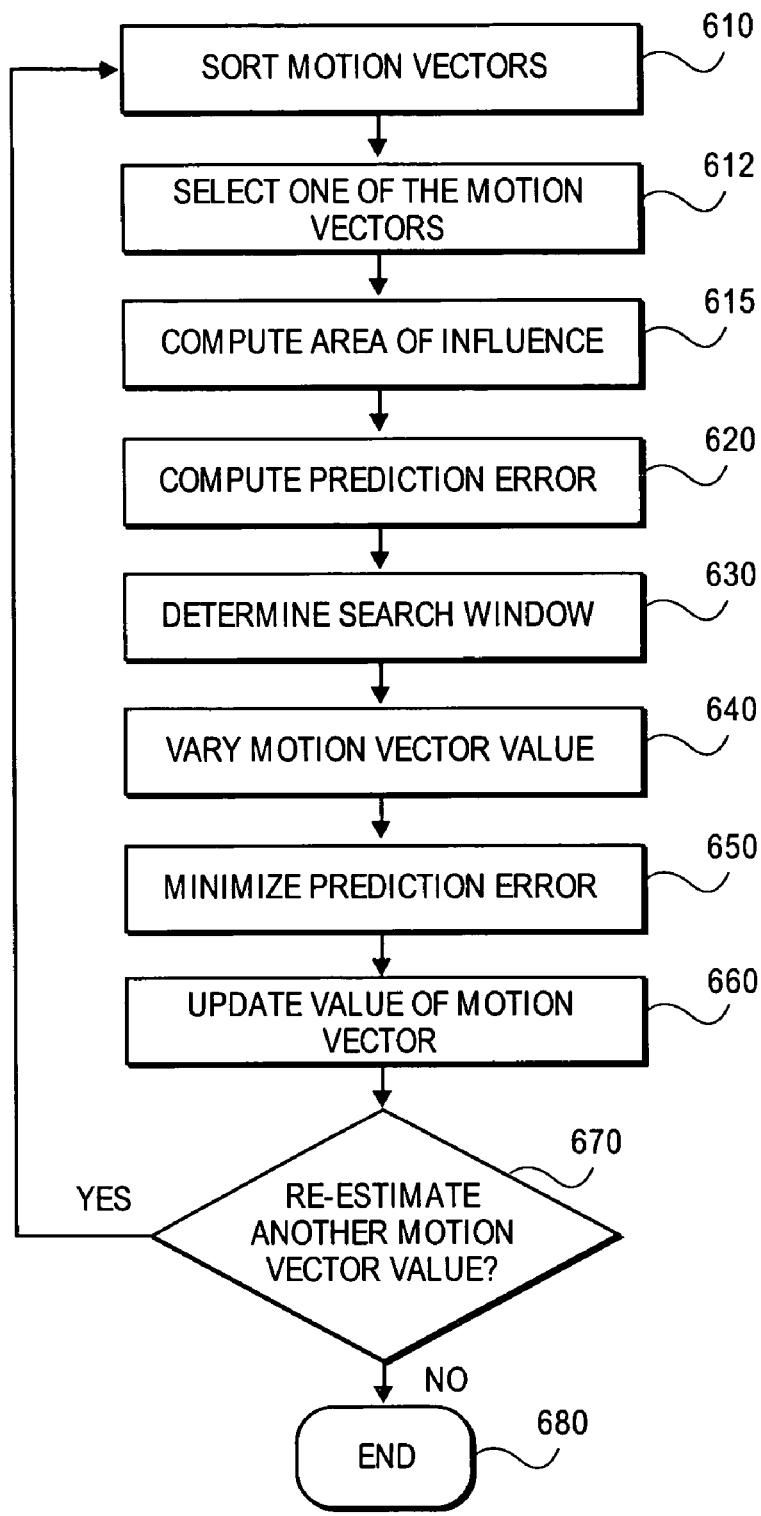
FIG. 6 shows an example of an error reduction method which can be used in the adaptive temporal filtering procedure.

An example of a re-estimation procedure is shown in FIG. 6. At 610, the motion vectors are sorted according to their prediction errors. The motion vector at the top of the list produces the highest error in the predicted image, and at 612 is selected to be re-estimated. At 615, the total area of influence for the selected motion vector is computed to produce $A_i^{T=0}$, where i represents the selected motion vector. At 620, the prediction error for all pixels in the set $A_i^{T=0}$ is computed to produce $e_i^{T=0}$.

At 630, a range for the search window, denoted as $\{SW_1, SW_2\}$; where $SW_1$ is the search window for the x-component of the motion vector, and $SW_2$ for the y-component of the motion vector, is determined. In one embodiment, the search window has a fixed range which is set as an input parameter by the system. For example, the range of the search window can be equal to the area of influence.

At 640, the x-component ($v_i^x$) and y-component ($v_i^y$) of the motion vector are varied within the fixed range of the search window:

$$v_i^x - SW_1, v_i^x - SW_1 + 1, \ldots, v_i^x + SW_1 - 1, v_i^x + SW_1$$

$$v_i^y - SW_2, v_i^y - SW_2 + 1, \ldots, v_i^y + SW_2 - 1, v_i^y + SW_2$$

At 650, the value for the selected motion vector that minimizes the prediction error $e_i^{T=0}$ for the pixels in the set $A_i^{T=0}$ is determined. At 660, the value of the motion vector is updated with the value determined at 650. At 670, if another motion vector needs to be re-estimated, the process returns to 610. Otherwise, the process ends at 680.

In some embodiments, the method of FIG. 6 can be modified to perform an adaptive re-estimation. Most of the complexity in the re-estimation process comes from identifying optimal values for motion vectors with large areas of influence. However, a large area of influence for a motion vector is usually due to a large degree of coherent motion within the area of influence. For a region of an image having a low density of motion vectors (i.e., large AOI cell), the re-estimation process can reduce the complexity of re-estimating the motion vector by (a) using a smaller search window, (b) reducing the area of influence used in computing the prediction error, (c) using a hierarchical search, or (d) performing any combination of (a), (b), and (c).

For regions of the image having a high density of motion vectors, the area of influence for a particular motion vector is generally small, and the motion is usually more incoherent. For these regions, the value of each motion vector can be re-estimated using a search window that covers most, if not all, of the associated area of influence without a significant increase in the computational complexity of performing the re-estimation process.

The adaptive aspects can be included in the re-estimation process of FIG. 6 as follows. At 615, the process computes an adaptive area of influence using magnitudes of filter coefficients and prediction errors to reduce the size of the area of influence. This can increase the performance speed of the process. For example, the total area of influence $A^{T=0}$ for the motion vector may involve a large amount of pixels, some of which do not have much of an effect on the prediction error when the value of the motion vector changes. To reduce the complexity, a threshold $T \neq 0$ is used to reduce the area of influence of the motion vector. This threshold is also adaptive to the irregular distribution of motion vectors. For example, a default threshold of $T_1 \approx 0.1$ can be set; for a motion vector with a larger area of influence $A^{T=0} > C_1$, the threshold can be increased to a higher value, such as $T_2 \approx 0.25$.

In another embodiment, at 615 the process calculates an adaptive area of influence using spatial activity. The spatial activity is defined around a compensated pixel that is identified in a reference image using the initial value of the motion vector. Pixels that map to low spatial activity regions within the reference image generally have a smaller impact on the value of the motion vector. High spatial activity regions dominate the selection of the value for the motion vector. In this embodiment, a local spatial activity value is computed for each pixel in the area of influence $A_i^T$. The area of influence, and hence the complexity of performing the re-estimation, of each motion vector can be reduced by using pixels having a local spatial activity value above a threshold, $C_{sa}$.

The adaptive process, at 630, can adapt the range of the search window according to an initial prediction error, instead of using the entire area of influence as the search window. For example, a motion vector with a small prediction error is usually in a region of an image having coherent motion and sparse motion vector density. For this type of motion vector, an extensive search window is unnecessary, because the initial value for the motion vector is already close to the optimal value. Thus, the size of the search window can be reduced by a factor of α.

Alternatively, at 630 the process can adapt the search window according to a magnitude of the initial motion vector. For motion vectors whose initial value is very small (e.g., $|\vec{v}|<M$), where M is a threshold magnitude, the re-estimated value of the motion vector is expected to also be small (i.e., less than M). Therefore, the search window can be reduced by a factor of β with little decrease in performance of the prediction.

In some embodiments, the adaptive process can perform a coarse-fine search for a re-estimated value of a motion vector with a large area of influence. For example, a motion vector with a large area of influence usually corresponds to a region of an image having a large amount of coherent motion. For this type of motion vector, a two-step search procedure can be performed at 640. First, the value for the motion vector is coarsely varied within the search window using a larger value of T. Then, the value of the motion vector is finely varied using a smaller T. This coarse-fine search procedure can be applied when the size of the area of influence is larger than a threshold value $C_2$.

Figure 7:
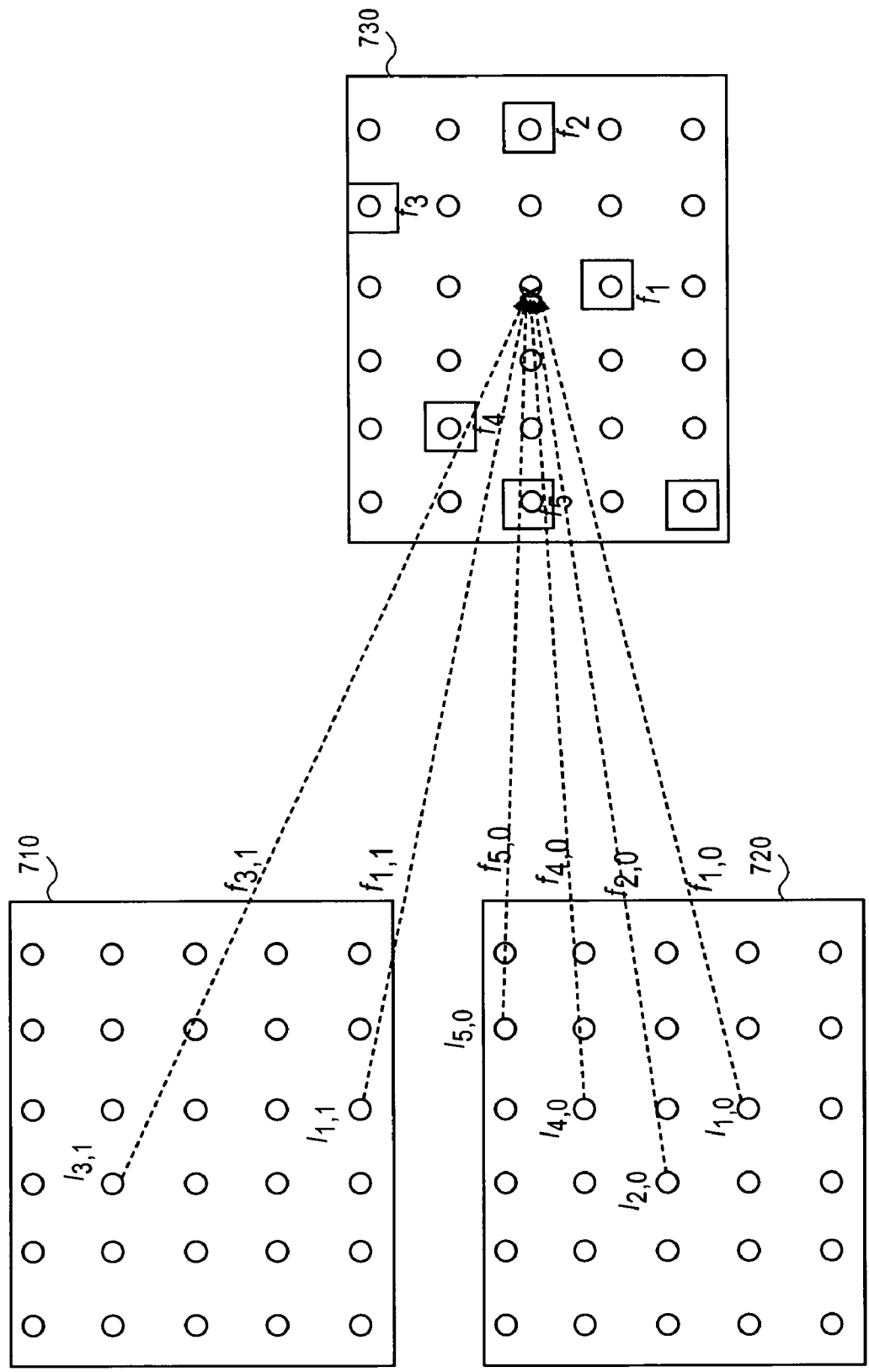
FIG. 7 shows an example of a prediction of a target image from multiple reference images that is performed with the adaptive temporal filter.

In some embodiments, the re-estimation procedure can be used with multiple reference images. For multiple reference images, the motion vector has, in addition to a motion vector value, a mode map, as shown in FIG. 7. For example, if two reference images are used, the mode map p is 0, 1, or ½. When $p_i=0$, the motion vector m uses reference image 720 for predicting target image 730. When $p_i=1$, the motion vector m uses reference image 710 for predicting target image 730. When $p_i=½$, the motion vector m takes the average of the prediction from each reference image. The two sets of motion vectors for reference images 710 and 720 are denoted as $\vec{v}_{i,0}$, $\vec{v}_{i,1}$, respectively.

In this example, referring to 240 of FIG. 2, the temporal prediction filter of eq. (1) is expanded to include two reference images:

$$I^{pred}(x_j) = \sum_{i\in S_j(x_j)} f_i^j\left((1-p_i)I_0^{ref1}(x_j+v_{i,o}^j)+p_iI_1^{ref}(x_j+v_{i,1}^j)\right) \quad (5)$$

Similarly, there are two sets of prediction errors for each motion vector, $\{e_{i,0}, e_{i,1}\}$, which are obtained from eqs. (3) and (4) for $p_i=\{0,1\}$, respectively. The filter for predicting the target pixel shown in FIG. 7 is:

$$I^{pred}=f_1(0.5*I_{1,0}+0.5I_{1,1})+f_2I_{2,0}+f_3I_{3,1}+f_4I_{4,0}+f_5I_{5,0}$$

When multiple reference images are used, re-estimating the motion vector values includes estimating the mode map relative to the temporal prediction filter, and varying the values of two motion vectors. The value of one motion vector is kept frozen, while the optimal value of the other motion vector and the mode map are determined. This process is repeated to vary the previously frozen value, and freeze the previously varied value. The selection of which value to vary first is determined using the prediction errors of the motion vectors. The motion vector with larger prediction error is varied first. In another embodiment, the two sets of motion vectors, and the mode map, are optimized simultaneously. Alternatively, the re-estimation process can proceed in multiple stages (instead of only two), where the process alternates between the two sets of motion vectors, with a correspondingly reduced search window to maintain the same complexity.

Figure 8:
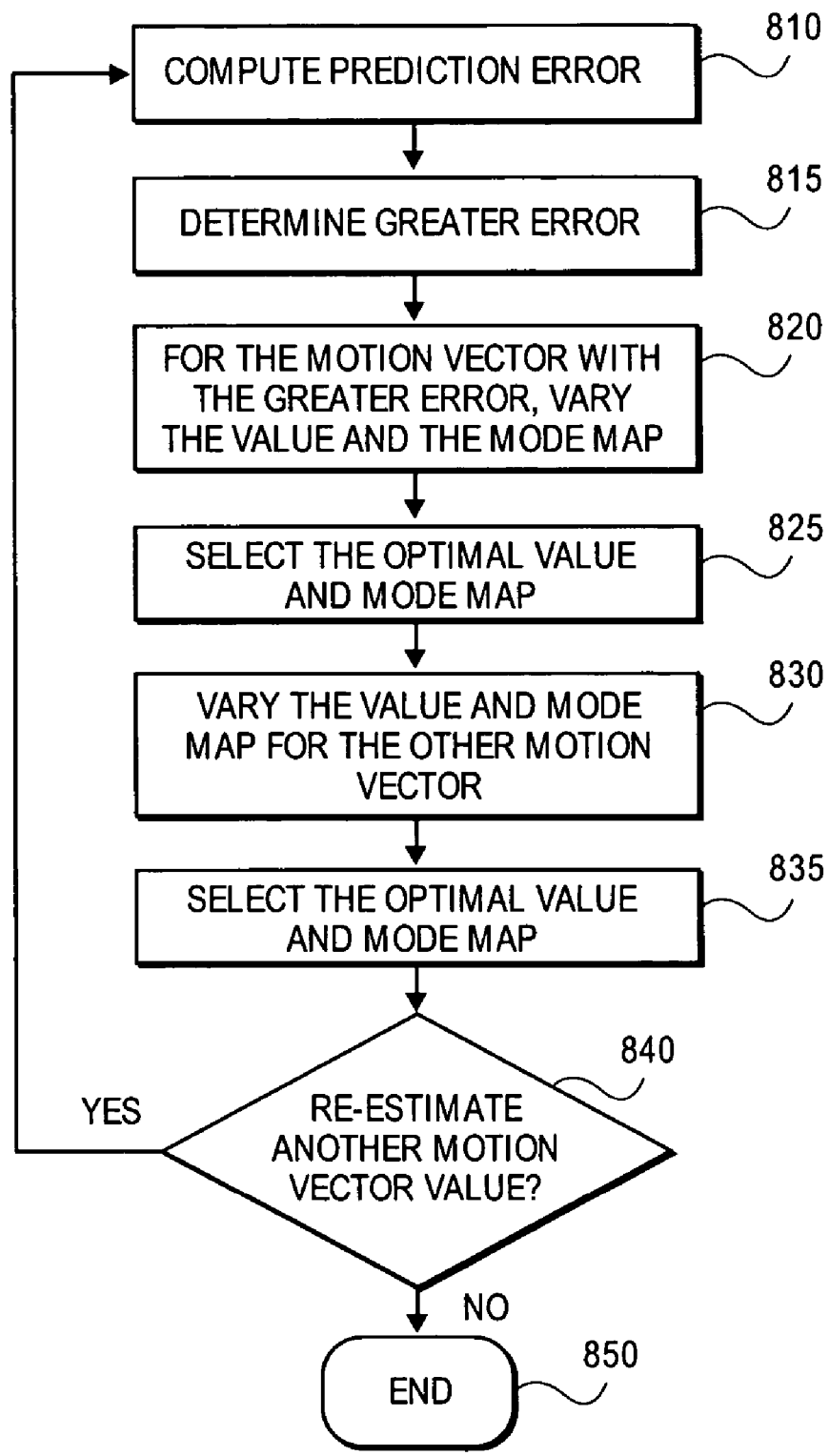
FIG. 8 shows another example of an error reduction method which can be used in the adaptive temporal filtering procedure.

An example of a method for re-estimating motion vector values using two reference images is shown in FIG. 8. For a particular motion vector, compute the two sets of prediction errors for pixels in the area of influence at 810 to yield the errors $e_{i,0}, e_{i,1}$. At 815, determine which error is greater. In this example, assume $e_{i,0}<e_{i,1}$. (When $e_{i,1}<e_{i,0}$, the same procedure is followed with $\{0,1\}$ reversed). At 820, vary the mode map and the value of the motion vector with the greater error, $\vec{v}_{i,1}$, within a search window in its area of influence. The optimal value of $\vec{v}_{i,1}$ and its corresponding optimal mode map $p_i$ are selected at 825. The optimal value minimizes the prediction error of the image predicted using eq. (5). At 830, vary the mode map and the value of the other motion vector $\vec{v}_{i,0}$. At 835, select the optimal value for $\vec{v}_{i,0}$ and its corresponding optimal mode map $p_i$. At 840, if another motion vector need to be re-estimated, the process returns to 810, otherwise, the process ends at 850. In some embodiments, the search window and area of influence may be adapted to reduce computational complexity, as discussed above.

Figure 9:
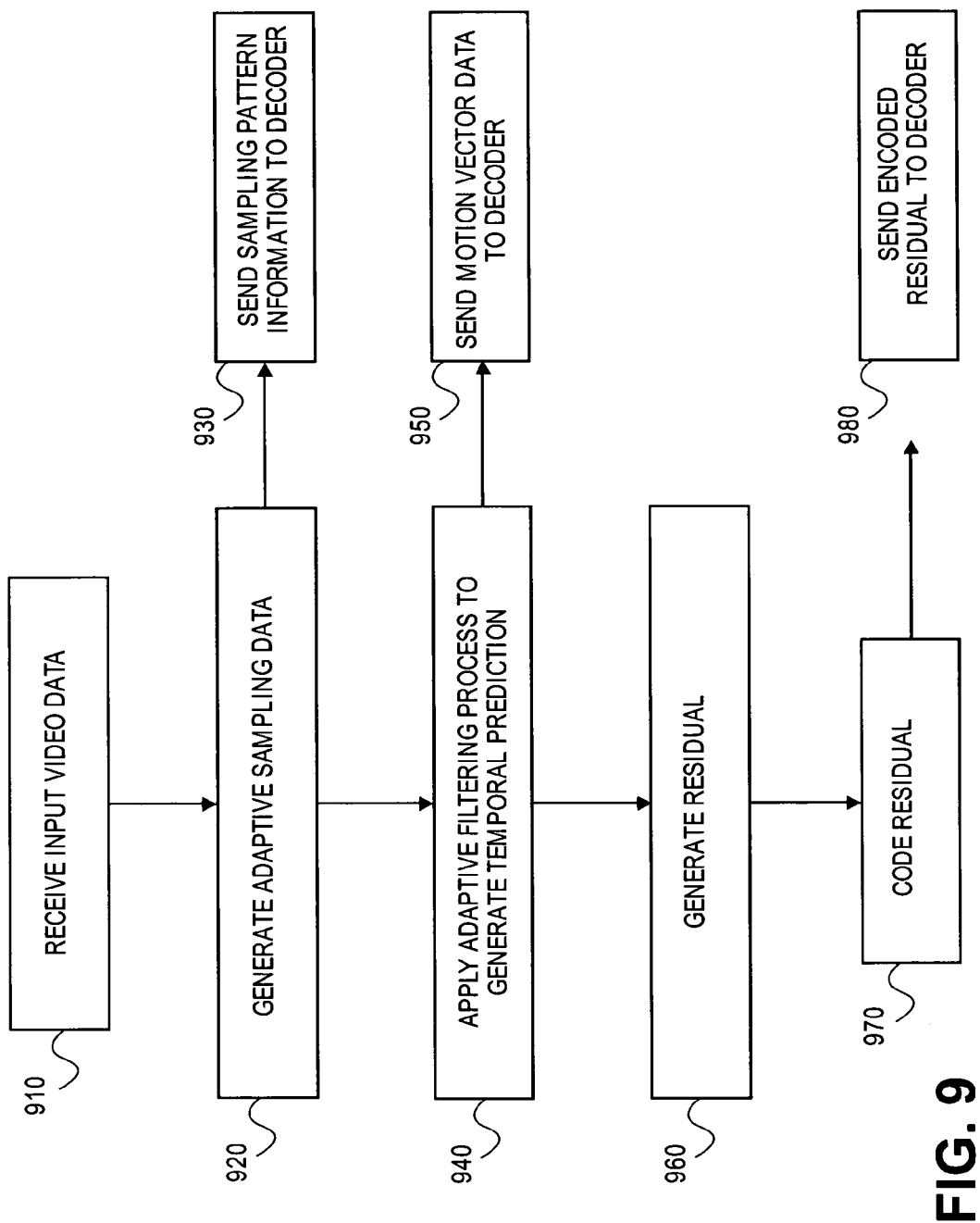
FIG. 9 shows an example of a coding system that uses the adaptive temporal filter.

In one embodiment, the adaptive temporal prediction filter is used by a video coding system for encoding an image (or frame, or field) of video data, as shown in FIG. 9. At 910, the encoder receives an input target image. (A set of reference images, which contain decoded image data related to the target image, is available to the encoder during the encoding process, and also to the decoder during the decoding process). At 920, the encoder generates a sampling, or distribution, of motion vectors associated with the target image. That is, given a number N of motion vectors, these N motion vectors are placed in the target image. The positions of the motion vectors are generally adapted to areas of motion in the image content, yielding an irregular pattern of motion vectors as shown in FIG. 3, for example. At 930, the sampling pattern information (e.g., bits to represent the pattern) is transmitted to a decoder. Many approaches can be used to generate the adaptive sampling pattern.

At 940, a temporal prediction filtering process is applied to the irregular motion sampling pattern. This adaptive filtering process uses the motion vectors, irregular sampling pattern, and reference images to generate a prediction of the target image. At 950, the motion vector values are coded and sent to the decoder. At 960, a residual is generated, which is the actual target data of the target image minus the prediction error from the adaptive filtering process. At 970, the residual is coded and, at 980 is sent to the decoder.

Figure 10:
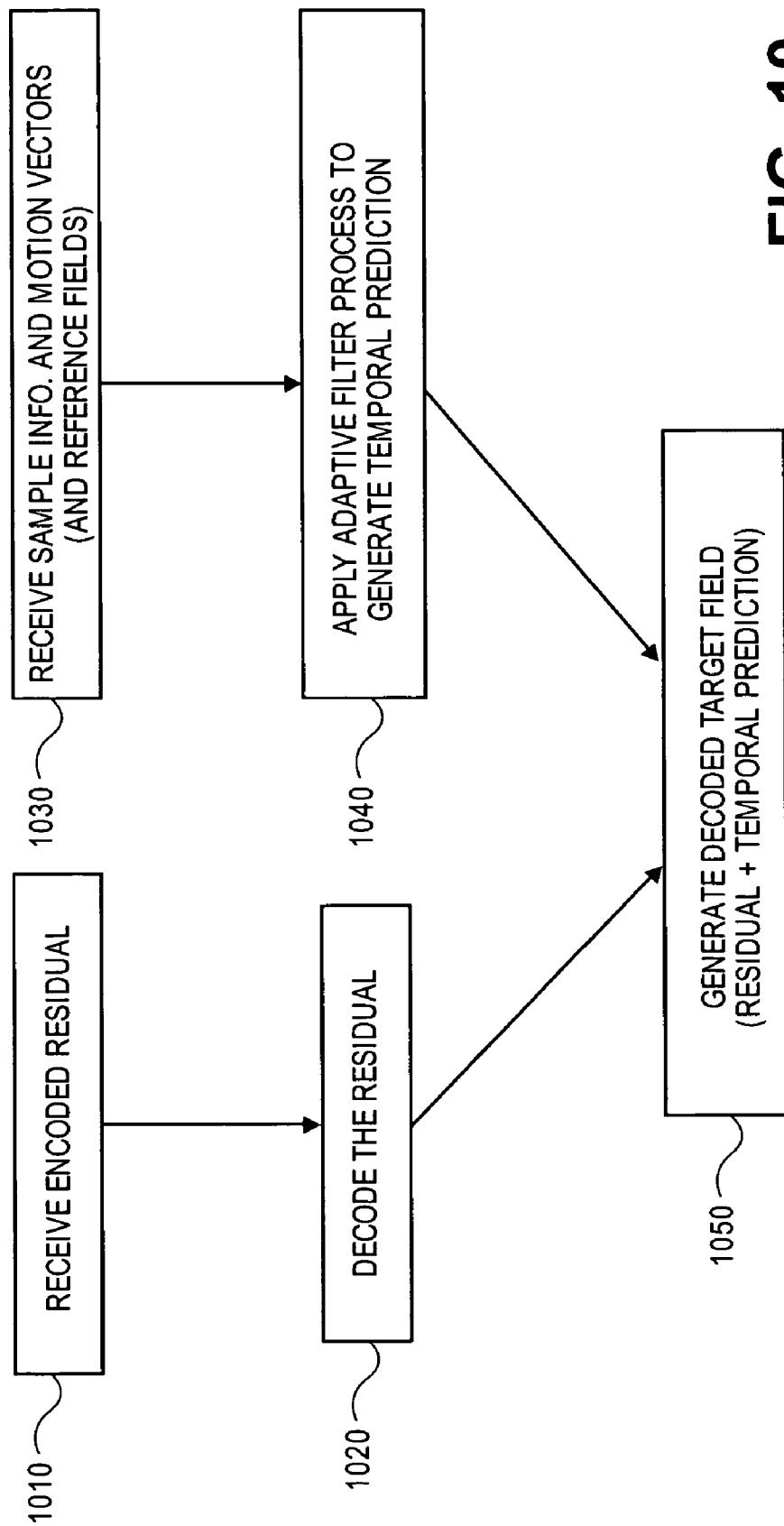
FIG. 10 shows an example of a decoding system that uses the adaptive area of influence filter.

In another embodiment, the adaptive temporal prediction filter is used in decoding a image (or frame, or image) of video data, as shown in FIG. 10. At 1010, an encoded residual is received. At 1020, the decoder decodes the received encoded residual. At 1030, the decoder receives the sample pattern information, reference images, and motion vector values. Then, at 1040 the decoder applies the adaptive temporal filter procedure to generate the temporal prediction. At 1050, the decoded target image is generated by adding the decoded residual to the temporal prediction.

Figure 11:
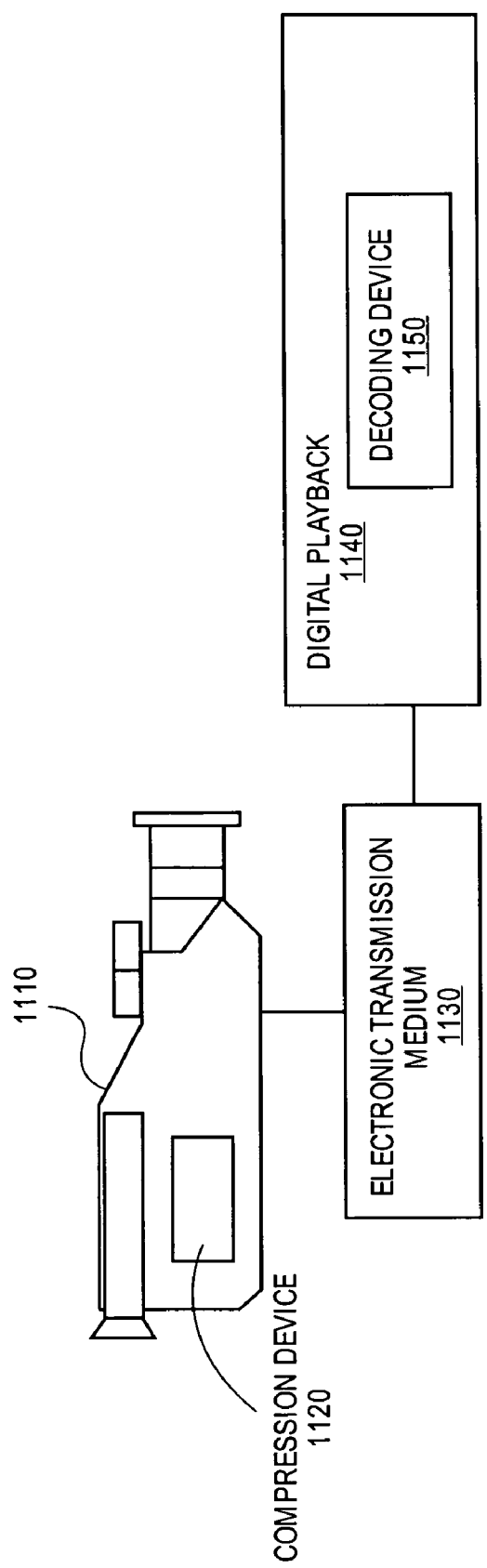
FIG. 11 shows an example of a digital camera system that uses the adaptive area of influence filter.

FIG. 11 shows an example of a system that uses the adaptive temporal prediction filter. A digital video camera 1110 captures images in an electronic form, and processes the images using compression device 1120, which uses the adaptive area of influence filter during the compression and encoding process. The encoded images are sent over an electronic transmission medium 1130 to digital playback device 1140. The images are decoded by decoding device 1150, which uses the filter during the decoding process. Camera 1110 is illustrative of various image processing apparatuses (e.g., other image capture devices, image editors, image processors, personal and commercial computing platforms, etc.) that include embodiments of the invention. Likewise, decoding device 1150 is illustrative of various devices that decode image data.

While the invention is described in terms of embodiments in a specific system environment, those of ordinary skill in the art will recognize that the invention can be practiced, with modification, in other and different hardware and software environments within the spirit and scope of the appended claims.

The invention claimed is:

1. A method carried out by an electronic data processor, comprising:
   receiving an irregular pattern of motion vectors for a target image;
   estimating an initial value for each of the motion vectors;
   using the motion vectors to generate a tap structure for an adaptive temporal prediction filter;
   determining an area of influence of each motion vector relative to the prediction filter;
   determining a prediction error of each pixel in the area of influence;
   determining a search window for the motion vector;
   comparing a size of the area of influence to a threshold value;
   if the size of the area of influence is larger than the threshold value, then coarsely varying the value of the motion vector within the search window to produce a first re-estimate of the value; and
   finely varying the first re-estimate of the value of the motion vector to produce a second re-estimate.

2. The method of claim 1, further comprising:
   using the re-estimated value of the motion vectors to generate a prediction of the target image.

3. The method of claim 1, wherein determining the area of influence of the motion vector relative to the prediction filter comprises:
   determining a total area of influence by selecting each pixel having a filter coefficient relative to the motion vector greater than zero.

4. The method of claim 1, wherein determining the area of influence of the motion vector comprises:
   determining a total area of influence of the motion vector;
   comparing a filter coefficient magnitude and a prediction error magnitude for each pixel in the total area of influence to a threshold value; and
   reducing the area of influence if a product of the filter coefficient and prediction error magnitude is greater than the threshold value.

5. The method of claim 1, wherein determining the search window comprises:
   setting an initial range of the search window to range of the area of influence;
   comparing the prediction error to a threshold value; and
   reducing the range of the search window if the prediction error is less than the threshold value.

6. The method of claim 1, wherein determining the search window comprises:
   setting an initial range of the search window to a range of the area of influence;
   comparing a magnitude of the initial value of the motion vector to a threshold value; and
   reducing the range of the search window if the magnitude is less than the threshold value.

7. The method of claim 1, wherein re-estimating comprises:
   using multiple reference images.

8. The method of claim 7, further comprising:
   for each reference image, varying a value of a motion vector associated with the reference image, and varying a mode map.

9. An apparatus comprising:
   a motion vector receiver that receives an irregular pattern of motion vectors for a target image;
   an estimator that estimates an initial value for each of the motion vector;
   a tap structure generator that uses the motion vectors to generate a tap structure for an adaptive temporal prediction filter;
   an area of influence device that determines an area of influence of each motion vector relative to the prediction filter;
   an error device that determines a prediction error of pixels in the area of influence;
   a search window device that determines a search window for the motion vector;
   logic that compares a size of the area of influence to a threshold value;
   logic that coarsely varies the value of the motion vector within the search window to produce a first re-estimate of the value, and that finely varies the first re-estimate of the value of the motion vector to produce a second re-estimate, if the size is greater than the threshold value.

10. The apparatus for claim 9, further comprising:
    a predictor that uses the re-estimated values of the motion vectors to generate a prediction of the target image.

11. The apparatus of claim 9, wherein the area of influence device comprises:
    determining logic that determines the total area of influence of the motion vector by selecting each pixel having a filter coefficient relative to the motion vector greater than zero.

12. The apparatus of claim 9, wherein the area of influence device comprises:
    determining logic that determines a total area of influence of the motion vector;
    a comparator that compares a filter coefficient magnitude and a prediction error magnitude for each pixel in the total area of influence to a threshold value; and
    reducing logic that reduces the area of influence if a product of the filter coefficient and prediction error magnitude is greater than the threshold value.

13. The apparatus of claim 9, wherein the search window device comprises:
    logic that sets an initial range of the search window to a range of the area of influence;
    logic that compares the prediction error to a threshold value; and
    logic that reduces the range of the search window if the prediction error is less than the threshold value.

14. The apparatus of claim 9, wherein the search window device comprises:
  logic that sets an initial range of the search window to a range of the area of influence;
  logic that compares a magnitude of the initial value of the motion vector to a threshold value; and
  logic that reduces the range of the search window if the magnitude is less than the threshold value.

15. The apparatus of claim 9, the re-estimator comprises:
  logic that uses multiple reference images.

16. The apparatus of claim 15, further comprising:
  logic that varies a value of a motion vector associated with the reference image, and varying a mode map for each of the multiple reference images.

17. A non-transitory computer readable medium storing a program of instructions which, when executed by a processing system, cause the system to perform a method comprising:
  receiving an irregular pattern of motion vector for a target image;
  estimating an initial value for each of the motion vectors;
  using the motion vectors to generate a tap structure for an adaptive temporal prediction filter;
  determining an area of influence of each motion vector relative to the prediction filter;
  determining a prediction error of each pixel in the area of influence;
  determining a search window for the motion vector;
  comparing a size of the area of influence to a threshold value;
  if the size of the area of influence is larger than the threshold value, then coarsely varying the value of the motion vector within the search window to produce a first re-estimate of the value; and
  finely varying the first re-estimate of the value of the motion vector to produce a second re-estimate.

18. The non-transitory computer readable medium of claim 17, further comprising:
  using the re-estimated values of the motion vectors to generate a prediction of the target image.

19. The non-transitory computer readable medium of claim 17, wherein determining the area of influence of the motion vector relative to the prediction filter comprises:
  determining a total area of influence by selecting each pixel having a filter coefficient relative to the motion vector greater than zero.

20. The non-transitory computer readable medium of claim 17, wherein determining the area of influence of the motion vector comprises:
  determining a total area of influence of the motion vector;
  comparing a filter coefficient magnitude and a prediction error magnitude for each pixel in the total of influence to a threshold value; and
  reducing the area of influence if a product of the filter coefficient and prediction error magnitude is greater than the threshold value.

21. The non-transitory computer readable medium of claim 17, wherein determining the search window comprises:
  setting an initial range of the search window to a range of the area of influence;
  comparing the prediction error to a threshold value; and
  reducing the range of the search window if the prediction error is less than the threshold value.

22. The non-transitory computer readable medium of claim 17, wherein determining the search window comprises:
  setting an initial range of the search window to a range of the area of influence;
  comparing a magnitude of the initial value of the motion vector to a threshold value; and
  reducing the range of the search window if the magnitude is less than the threshold value.

23. The non-transitory computer readable medium of claim 17, wherein re-estimating comprises:
  using multiple reference images.

24. The non-transitory computer readable medium of claim 23, further comprising:
  for each reference image, varying a value of a motion vector associated with the reference image, and varying a mode map.

* * * * *